(12) United States Patent
Sun et al.

(10) Patent No.: US 8,744,839 B2
(45) Date of Patent: Jun. 3, 2014

(54) RECOGNITION OF TARGET WORDS USING DESIGNATED CHARACTERISTIC VALUES

(75) Inventors: Haibo Sun, Hangzhou (CN); Yang Yang, Hangzhou (CN); Yining Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 308 days.

(21) Appl. No.: 13/240,034

(22) Filed: Sep. 22, 2011

(65) Prior Publication Data

US 2012/0078631 A1 Mar. 29, 2012

(30) Foreign Application Priority Data

Sep. 26, 2010 (CN) .......................... 2010 1 0295054

(51) Int. Cl.
*G06F 17/20* (2006.01)
*G06F 17/28* (2006.01)
*G06F 17/27* (2006.01)
*G06F 17/21* (2006.01)
*G10L 15/00* (2013.01)
*G10L 15/16* (2006.01)
*G10L 15/20* (2006.01)
*G10L 15/26* (2006.01)
*G10L 15/06* (2013.01)
*G10L 17/00* (2013.01)
*G10L 15/04* (2013.01)
*G10L 15/28* (2013.01)
*G10L 15/14* (2006.01)
*G10L 15/18* (2013.01)
*G10L 13/00* (2006.01)
*G06F 7/00* (2006.01)
*G06F 17/00* (2006.01)
*G06F 17/30* (2006.01)
*G06F 12/00* (2006.01)

(52) U.S. Cl.
USPC .............. 704/10; 704/2; 704/4; 704/8; 704/9; 704/3; 704/233; 704/251; 704/235; 704/257; 704/254; 704/214; 704/255; 707/784; 707/749; 707/741; 707/748; 707/740; 707/722; 707/723; 707/755; 707/742; 707/697; 707/607; 707/602; 707/770; 707/730; 707/769; 707/756; 707/718; 707/737; 707/692; 707/792; 707/794; 707/759; 707/758; 707/690; 707/754; 707/767; 707/706; 707/695; 707/827; 707/661; 707/752; 707/710; 707/751; 707/750; 707/738; 707/803; 707/765; 707/766; 707/709; 707/705

(58) Field of Classification Search
CPC . G06F 17/274; G06F 17/289; G06F 17/2872; G06F 9/4448; G06F 14/2785; G06F 17/2735; G06F 17/30864; G06F 17/30707; G06F 17/30616; G06F 17/3071; G06F 17/2247; G06F 17/30569; G06F 17/30867; G06F 17/30463; G06F 7/24; G06F 17/3064; G06F 17/30268; G06F 17/30067; G06F 17/30607; G06F 17/30734; G06F 3/0643; G06F 17/30592; G06F 9/466; G06F 11/1402; G06Q 30/02; G06Q 10/10; G10L 15/22; G10L 15/16; G10L 15/20; G10L 15/265; G10L 15/02; G10L 15/10; G10L 15/00; G10L 15/08; G10L 15/12; G10L 15/063; G10L 17/005; G10L 17/02; G10L 25/87; G10L 15/187; G10L 15/42; G10L 15/142; G10L 15/144; G10L 13/06; G10L 15/14; H05K 999/99
USPC ........ 704/1–10, 231–257, 275; 707/748, 723, 707/730, 728, 705–711, 722, 740–742, 738, 707/737, 759, 758, 755, 756, 750, 749, 751, 707/754, 718, 752, 765–770, 690, 692, 792, 707/794, 784, 697, 607, 602, 673, 661, 695, 707/803, 811, 827
See application file for complete search history.

(56) References Cited

U.S. PATENT DOCUMENTS

| | | | |
|---|---|---|---|
| 5,526,259 A | 6/1996 | Kaji | |
| 7,225,182 B2* | 5/2007 | Paine et al. | 707/709 |
| 7,254,530 B2* | 8/2007 | Klavans et al. | 704/10 |
| 7,424,421 B2* | 9/2008 | Okumura | 704/8 |
| 7,555,428 B1* | 6/2009 | Franz et al. | 704/10 |
| 7,580,831 B2* | 8/2009 | Haskell et al. | 704/10 |
| 7,917,355 B2* | 3/2011 | Wu et al. | 704/10 |
| 7,996,369 B2* | 8/2011 | Li et al. | 707/673 |
| 8,010,344 B2* | 8/2011 | Zhang | 704/10 |
| 8,131,539 B2* | 3/2012 | Liu et al. | 704/9 |
| 8,234,106 B2* | 7/2012 | Marcu et al. | 704/2 |
| 8,346,534 B2* | 1/2013 | Csomai et al. | 704/1 |
| 8,392,440 B1* | 3/2013 | Papachristou et al. | 707/759 |
| 8,392,441 B1* | 3/2013 | Papachristou et al. | 707/759 |
| 8,463,598 B2* | 6/2013 | Wu et al. | 704/10 |
| 8,515,974 B2* | 8/2013 | Consul et al. | 707/750 |
| 8,539,349 B1* | 9/2013 | Kirshenbaum | 715/264 |
| 8,560,529 B2* | 10/2013 | Tunkelang et al. | 707/722 |
| 2002/0042793 A1* | 4/2002 | Choi | 707/6 |
| 2003/0083861 A1* | 5/2003 | Weise | 704/9 |
| 2003/0167275 A1* | 9/2003 | Rjaibi | 707/101 |
| 2004/0098380 A1* | 5/2004 | Dentel et al. | 707/3 |
| 2004/0199375 A1 | 10/2004 | Ehsani et al. | |
| 2006/0004732 A1* | 1/2006 | Odom | 707/3 |
| 2006/0106604 A1* | 5/2006 | Okimoto | 704/243 |
| 2006/0123045 A1* | 6/2006 | Chang et al. | 707/102 |
| 2006/0206313 A1* | 9/2006 | Xu et al. | 704/10 |
| 2006/0282258 A1* | 12/2006 | Tsuzuki et al. | 704/10 |
| 2007/0112839 A1* | 5/2007 | Bjarnestam et al. | 707/102 |
| 2007/0150275 A1 | 6/2007 | Garner et al. | |
| 2007/0162281 A1* | 7/2007 | Saitoh et al. | 704/251 |
| 2008/0077397 A1* | 3/2008 | Shimohata | 704/10 |
| 2008/0091434 A1* | 4/2008 | Rodriguez et al. | 704/275 |
| 2008/0312911 A1* | 12/2008 | Zhang | 704/10 |
| 2008/0319738 A1* | 12/2008 | Liu et al. | 704/10 |
| 2009/0070097 A1* | 3/2009 | Wu et al. | 704/2 |
| 2009/0150139 A1 | 6/2009 | Jianfeng et al. | |
| 2009/0299998 A1* | 12/2009 | Kim | 707/5 |
| 2010/0070263 A1 | 3/2010 | Goto et al. | |
| 2010/0114878 A1* | 5/2010 | Lu et al. | 707/723 |
| 2010/0138411 A1* | 6/2010 | Judy et al. | 707/723 |
| 2010/0145677 A1* | 6/2010 | Shu | 704/9 |
| 2010/0161655 A1* | 6/2010 | Gil et al. | 707/769 |
| 2010/0174528 A1* | 7/2010 | Oya et al. | 704/10 |
| 2010/0205198 A1* | 8/2010 | Mishne et al. | 707/759 |
| 2010/0211567 A1* | 8/2010 | Abir | 707/730 |
| 2010/0235341 A1 | 9/2010 | Bennett | |
| 2010/0287177 A1* | 11/2010 | Resnick et al. | 707/765 |
| 2011/0054901 A1 | 3/2011 | Qin et al. | |
| 2011/0055192 A1* | 3/2011 | Tang et al. | 707/706 |
| 2011/0082848 A1* | 4/2011 | Goldentouch | 707/706 |
| 2011/0282903 A1* | 11/2011 | Zhang | 707/769 |
| 2012/0191717 A1* | 7/2012 | Chen et al. | 707/740 |

OTHER PUBLICATIONS

Huang et al., "Chinese Word Segmentation Based on Contextual Entropy", PACL, 2003.*
Lesher et al., "Leveraging Word Prediction to Improve Character Prediction In A Scanning Configuration", RESNA '99.*
Miller et al., Performance and Scalability of a Large-Scale N-gram Based Information Retrieval System, 1999.*

* cited by examiner

*Primary Examiner* — Paras D Shah
*Assistant Examiner* — Anne Thomas-Homescu
(74) *Attorney, Agent, or Firm* — Van Pelt, Yi & James LLP (57) ABSTRACT

Target word recognition includes: obtaining a candidate word set and corresponding characteristic computation data, the candidate word set comprising text data, and characteristic computation data being associated with the candidate word set; performing segmentation of the characteristic computation data to generate a plurality of text segments; combining the plurality of text segments to form a text data combination set; determining an intersection of the candidate word set and the text data combination set, the intersection comprising a plurality of text data combinations; determining a plurality of designated characteristic values for the plurality of text data combinations; based at least in part on the plurality of designated characteristic values and according to at least a criterion, recognizing among the plurality of text data combinations target words whose characteristic values fulfill the criterion.

21 Claims, 4 Drawing Sheets

RECOGNITION OF TARGET WORDS USING DESIGNATED CHARACTERISTIC VALUES

CROSS REFERENCE TO OTHER APPLICATIONS

This application claims priority to People's Republic of China Patent Application No. 201010295054.7 entitled A METHOD, DEVICE AND SYSTEM FOR THE RECOGNITION OF TARGET WORDS filed Sep. 26, 2010 which is incorporated herein by reference for all purposes.

FIELD OF TECHNOLOGY

The present disclosure relates the field of computers; in particular, it relates to target word recognition techniques.

BACKGROUND OF THE INVENTION

Since the advent of Internet technology, information growth has been explosive. Information retrieval, information analysis, and machine translation are important technologies for making effective use of the information. Automated Chinese language word segmentation is a fundamental technique for the processing of Chinese language information. One difficulty that influences the effectiveness of automated word segmentation is the recognition of previously unlisted words. Unlisted words refer to words yet to be recorded in the word segmentation dictionary. Unlisted words can be divided into two types. One type is words that cannot be listed in dictionaries in their entirety, but for which it is possible to summarize patterns (such as personal names, institutional names, etc.); the other type is new words that should be listed in the dictionary, but have yet to be listed. Among these new words, some are target words that should be listed in the segmentation dictionary, while others are not words, that is to say, they are non-target words that should not be listed in the dictionary.

When recognizing newly appeared words, first a determination must be made as to whether these newly appeared words are words or not, specifically, whether the newly appeared words are target words or not. Currently there are three typical approaches for making the determination: a rule-based method, a statistics-based method, and a method that combines rules and statistics. The most popular statistics-based method is generally to collect statistics with regard to one or several characteristic values of words to be recognized based on large-scale text data, and, based on the statistical results, manually set a threshold value. When a word to be recognized exceeds the established threshold value, the word is determined to be a target word.

However, with the widespread use of the Internet and in an environment when the volume of text data that appears on the Internet is very large, there is already a lack of complete semantic sentence patterns just for the accumulation of certain keywords. For example, on e-commerce websites, and particularly on consumer-to-consumer or customer-to-customer (C2C) e-commerce websites, there can be a massive number of product headers. A large number of these keywords are newly appeared words; however, at this time, the statistical distributions for these newly appeared words tend to be non-linear. When recognition is performed, the results obtained by setting a single threshold value with regard to characteristic values and then determining whether or not the newly appeared words are target words according to the single threshold value are often inaccurate. Thus, the conventional statistics-based method of deciding whether or not words to be recognized are target words is often not well suited for target word recognition in current network applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A target word recognition technique is disclosed. The technique overcomes the limitations of existing statistics-based methods of text data recognition, namely, that they typically are only able to use a relatively small number of characteristic values and that they typically require the statistical results to demonstrate linear distribution, as well as errors and instability resulting from manually adjusted characteristic value weightings and manually set threshold values. Embodiments of target word recognition techniques are disclosed that are able to use characteristic values of any dimensions and, when the characteristic value distribution trend is non-linear (such as non-linear distribution over time), are still able to accurately determine target words, without requiring human intervention, thus increasing the accuracy and recall rate of target word recognition.

Figure 1:
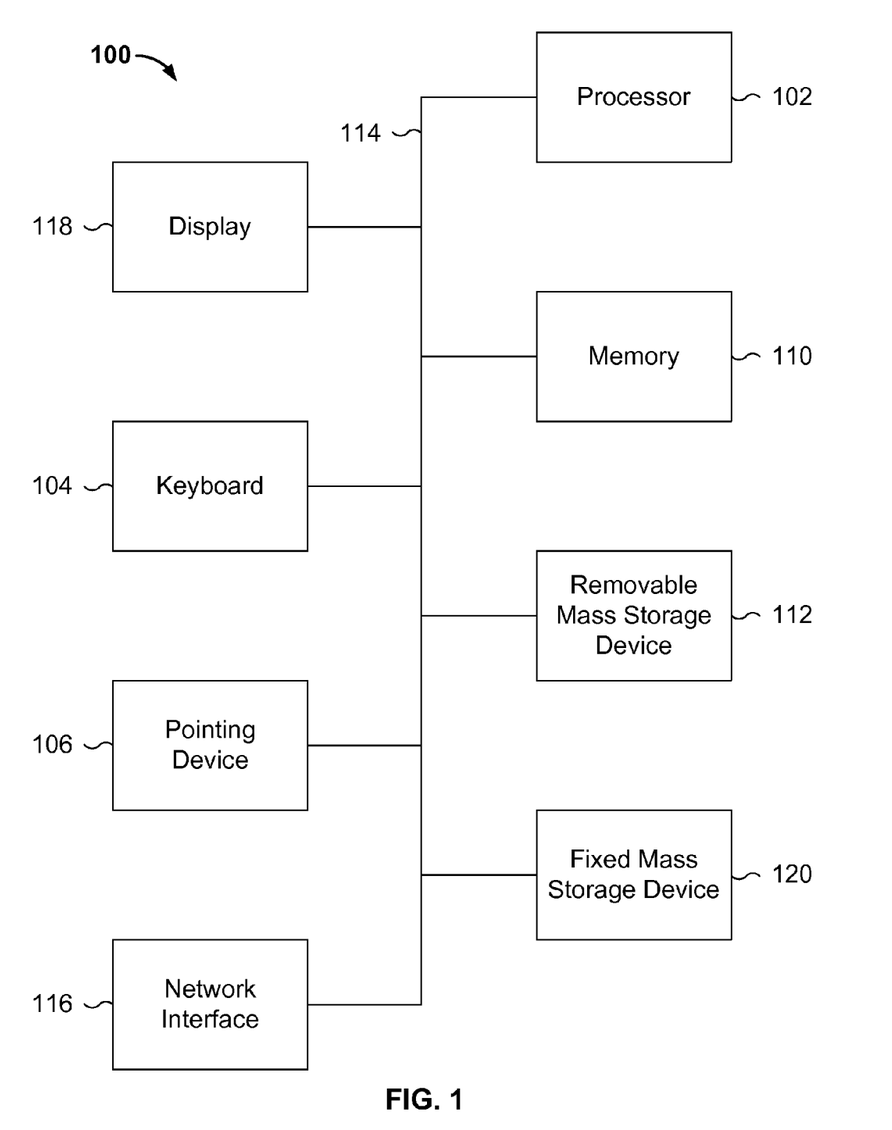
FIG. 1 is a functional diagram illustrating a programmed computer system for target word recognition in accordance with some embodiments.

FIG. 1 is a functional diagram illustrating a programmed computer system for target word recognition in accordance with some embodiments. As shown, FIG. 1 provides a functional diagram of a general purpose computer system programmed to perform target word recognition in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide target data providing module, target word recognition module, and/or target word listing module described below with respect to FIG. 2A and/or executes/performs the processes described below with respect to FIGS. 3-4.

Processor 102 is coupled bi-directionally with memory 110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions (e.g., programmed instructions). For example, primary storage devices 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112 and 120 generally store additional programming instructions, data, and the like that typically are not in active use by the processor 102. It will be appreciated that the information retained within mass storage 112 and 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

As used herein, words refer to words as well as phrases. In some embodiments, target word recognition includes obtaining a candidate word set comprising text data, and corresponding characteristic computation data associated with the candidate word set. It further includes segmentation of the characteristic computation data to generate a plurality of text segments; combining the plurality of text segments to form a text data combination set; and determining an intersection of the candidate word set and the text data combination set. A plurality of designated characteristic values for the plurality of text data combinations is determined. Based at least in part on the plurality of designated characteristic values and according to at least a criterion, target words whose characteristic values fulfill the criterion are recognized among the plurality of text data combinations.

As used herein, when a candidate word is a common term that fulfills the requirements of being collected into a dictionary (also referred to as a term in the usual sense), the candidate word is a target word; otherwise, when a candidate word is not a term in the usual sense, the candidate word is not a target word. Details of how to determine whether a candidate word is a target word are described more fully below.

For example, assume a candidate word set includes "batwing sleeves" (a type of loose-fitting sleeves often seen in women's clothing) and "sleeves women's apparel." Of these terms "batwing sleeves" is a term in the usual sense that fulfills the requirements of being collected into a dictionary since it has a specific meaning that is commonly accepted, while "sleeves women's apparel" does not have a commonly accepted meaning, therefore it is not a term in the usual sense and is not included in a dictionary.

The candidate word set may be any text data, and its corresponding characteristic computation data may also be any text data. In some embodiments of the present disclosure, user-inputted query keywords are used, and a candidate word set is based on user-inputted query keywords, and characteristic computation data is extracted from the description of search results in response to user-inputted query keywords. For example, on an e-commerce website, user-inputted keywords are used in queries about products. A candidate word set is extracted from the query keywords, and characteristic computation data is extracted from such descriptive information as product headers and product information on e-commerce websites. As another example, on news websites, query keywords that are inputted by users in queries about news are collected and stored, and a candidate word set is extracted from the query keywords while characteristic computation data is extracted from such descriptive information as news headlines and news content on the news website.

The extraction of the described candidate word set and characteristic computation information can be carried out using periodic or quantitative methods. For example, candidate word sets is periodically extracted from user-inputted keywords. Accordingly, the characteristic computation data are extracted periodically. Another possibility is that once the user-inputted query keywords used for candidate set extraction reach a certain number, the corresponding characteristic computation information is extracted, and target word recognition according to embodiments of the present disclosure is executed.

As used herein, accuracy refers to the ratio of the number of correctly recognized word segments among those recognized as target words to the number of words identified as target words. As used herein, recall rate refers to the ratio of the number of correctly recognized target words among the candidate words to the number of word segments that are actually target words among the candidate words.

Figure 2A:
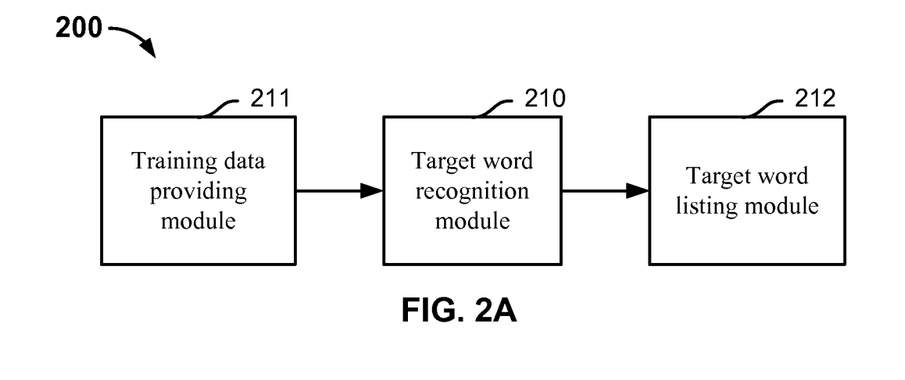
FIG. 2A is a system diagram illustrating an embodiment of a target word recognition system.

FIG. 2A is a system diagram illustrating an embodiment of a target word recognition system. In this example, system 200 includes a target word recognition module 210, a training data providing module 211, and a target word listing module 212. Each module or all the modules may be implemented using one or more computer systems such as 100.

Target word recognition module 210 is used to: obtain a candidate word set and characteristic computation data; based on the text data of minimum granularity, carry out word segmentation of the characteristic computation data; carry out word segment combination processing on word segments obtained by word segmentation; obtain a text data combination set to be processed; determine the intersection of the candidate word set and the text data combination set; compute the designated characteristic values of each text data combination contained in the intersection; based on multiple designated characteristic values of each text data combination contained in the described intersection, carry out the screening of the text data combination contained in the described intersection according to screening criteria that are predetermined based on multiple designated characteristic values, and determine the candidate words corresponding to the text data combination whose characteristic values fulfill the screening criteria to be the target words.

Training data providing module 211 is used to provide to the target word recognition module a training sample word set and the corresponding sample characteristic computation data that are needed to obtain the screening criteria.

Target word listing module 212 is used to receive the target words recognized by the target word recognition module 210, and enter the previously unlisted target words in the word segment dictionary.

Figure 2B:
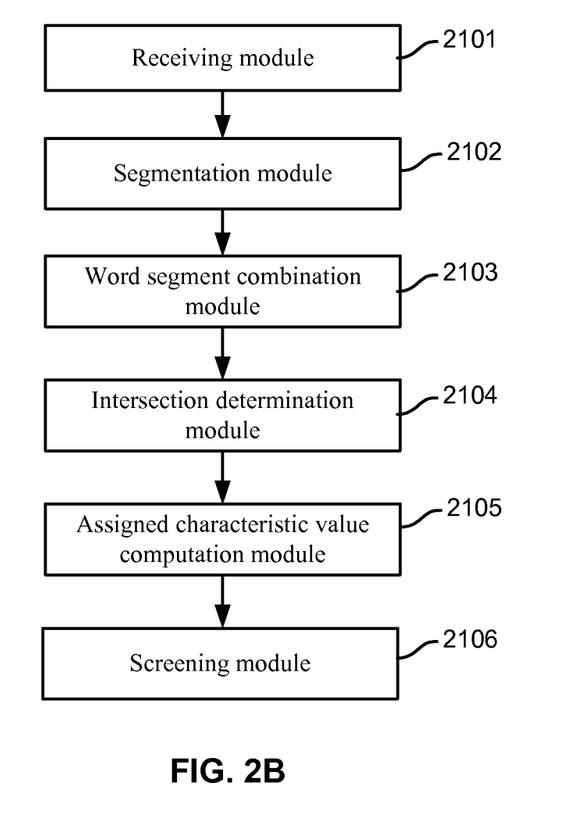
FIG. 2B is a system diagram illustrating an embodiment of a target word recognition module.

FIG. 2B is a system diagram illustrating an embodiment of a target word recognition module. In the embodiment shown, the target word recognition module includes: a receiving module 2101, used to receive a candidate word set and characteristic computation data; a segmentation module 2102, used to carry out, based on the text data of minimum granularity, word segment separation of the computation data; a word segment combination module 2103, used to carry out word segment combination processing with regard to word segments obtained by segmentation and obtain a text data combination set which is the object of processing; an intersection determination module 2104, used to determine the intersection of the described candidate word set with the described text data combination set; an assigned characteristic value computation module 2105, used to compute the multiple designated characteristic values of each text data combination contained in the intersection; a screening module 2106, used to carry out, based on multiple designated characteristic values of each text data combination contained in the described intersection, the screening of the text data combination contained in the described intersection according to screening criteria that are preset based on multiple designated characteristic values, and determine the candidate words corresponding to the text data combination whose characteristic values fulfill the screening criteria to be the target words.

In some embodiments, the screening criteria based on multiple designated characteristic values are obtained by training a sorting technique for a training sample word set. An example of using a sorting technique such as the gradient boosting and decision tree (GBDT) sorting technique to obtain the screening criteria based on multiple designated characteristic values is described more fully below. When the screening criteria are obtained, the receiving module 2101 of the target word recognition module 210 is used to receive a training sample word set and sample characteristic computation data. The segmentation module 2102 is used to carry out, based on the text data of minimum granularity, word segmentation for the described sample characteristic computation data. The word segment combination module 2103 is used to carry out word segment combination processing on the characteristic computation data and obtain a sample text data combination set which is the object of processing. The intersection determination module 2104 is used to determine the intersection of the described sample text data combination set with the described training sample word set. The assigned characteristic value computation module 2105 is used to compute the multiple designated characteristic values of each sample text data combination contained in the described intersection. The screening module 2106 is used to set, based on multiple designated characteristic values of each sample text data combination contained in the described intersection and on the known sorted results, threshold values of the described multiple designated characteristic values and obtain corresponding screening criteria based on the threshold values.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

In the embodiments of the present disclosure, designated characteristic values can include mutual information, logarithmic likelihood ratio, context entropy (left entropy, right entropy), position-based in-word probabilities of a character, and may further include dice matrices, Chi, etc. To obtain the screening criteria and recognize target words, the required designated characteristic values can be combinations of any two or more types among the above-mentioned designated characteristic values.

In some embodiments, the formula to compute mutual information (MI) is $$MI(a, b) = \log_2 \frac{p_{ab}}{p_a p_b} = \log_2 \frac{c_{ab} \cdot n}{c_a c_b} \qquad [1]$$

In formula [1], "a" and "b", respectively, stand for single word segments of minimum granularity, while "ab" stands for the text data combination resulting from the combination of two word segments; $p_a$ and $p_b$ stand for the respective probabilities of word segment "a" and word segment "b" appearing in the characteristic computation data; $p_{ab}$ stands for the probability of "ab" appearing in the characteristic computation data; $c_{ab}$ stands for the number of times "ab" appears together in the characteristic computation data, $c_a$ stands for the number of times "a" appears in the characteristic computation data; $c_b$ stands for the number of times "b" appears in the characteristic computation data; n stands for the number of word segments resulting from performing, based on the text data of minimum granularity, word segmentation of the characteristic computation data. In the computation of the mutual information of the word segment "a" and the word segment "b", $p_{ab}$ is inversely correlated to $p_a$ and $p_b$.

For example, assuming that the characteristic computation data is "round collar women's apparel, batwing sleeve women's apparel," when computing the mutual information of the word segment "batwing sleeve," the word segment "a" is "batwing," the word segment "b" is "sleeve," and the word segment "ab" is "batwing sleeve." $p_a$ stands for the probability of the word segment "batwing" appearing in the characteristic computation data and $p_b$ stands for the probability of the word segment "sleeve" appearing in the characteristic computation data. $p_{ab}$ stands for the probability of "batwing sleeve" appearing in the characteristic computation data. $c_a$ stands for the number of times "batwing" appears in the characteristic computation data; $c_b$ stands for the number of times "sleeve" appears in the characteristic computation data; n stands for the number of word segments resulting from performing, based on the text data of minimal granularity, separation into word segments of the characteristic computation data. Here, the characteristic computation data can be separated into 5 word segments "round collar," "women's apparel," "batwing," "sleeve," and "women's apparel." Hence, for a of "batwing" and b of "sleeve," $c_{ab}$ is 1, $c_a$ is 1, $c_b$ is 1, and n is 5.

In some embodiments, logarithmic likelihoods are used to determine the tightness of the connection between individual word segments. The formula for computing logarithmic likelihoods is the following:

$$\log L(a, b) = ll\left(\frac{k_1}{n_1}, k_1, n_1\right) + ll\left(\frac{k_2}{n_2}, k_2, n_2\right) - \qquad [2]$$
$$ll\left(\frac{k_1 + k_2}{n_1 + n_2}, k_1, n_1\right) - ll\left(\frac{k_1 + k_2}{n_1 + n_2}, k_2, n_2\right),$$
$$ll(p, k, n) = k\log(p) + (n - k)\log(1 - p)$$

In formula [2], "a" and "b," respectively, represent single word segments of minimum granularity; $k_1$ stands for the number of times "ab" appears in the characteristic computation data; $n_1$ stands for the number of times "a" appears in the text data combination on the left in the multiple text data combination resulting from word segmentation of the characteristic computation data using the text data of minimum granularity; $k_2$ stands for the number of text data combinations such that "b" appears on the right in the multiple text data combination resulting from a sequential combination using the above-mentioned language model and such that what is on the left is not "a." $n_2$ stands for the number of text data combinations such that what is on the left is not "a" within the multiple text data combination resulting from a sequential combination using the above-mentioned language model.

Based on characteristic computation data in the example above, the characteristic computation data is separated into 5 word segments "round collar," "women's apparel," "batwing," "sleeve," and "women's apparel." Two-element combining is carried out with regard to the above-mentioned word segments, 4 combinations of text data are obtained: "round collar women's apparel," "women's apparel batwing," "batwing sleeve," and "sleeve women's apparel." When the logarithmic likelihood of "batwing sleeve" is calculated, $k_1$ is the number of times "batwing sleeve" appears in the characteristic computation data; $n_1$ is the number of combination(s) of text data out of the above-mentioned 4 combinations of text data where "batwing" appears on the left, while $k_2$ is the number of combination(s) of text data out of the above-mentioned 4 combinations of text data where "sleeve" appears on the right and the left side is not "batwing"; $n_2$ is the number of combination(s) of text data out of the above-mentioned 4 text data combination where the right side is not "batwing."

Context entropy is used to express the degree of freedom of the use of multiple word segment expressions. Entropy is the expression of the uncertainty factor; the larger the entropy, the more uncertain random events are. A character string that can only be used in a fixed context has a small context entropy value, while a character string that can be used in many different contexts has a high context entropy value. Context entropy includes left entropy and right entropy. In some embodiments, the formula to compute left entropy (LE) is:

$$LE(ab) = \sum_{x \in left} -p(x|ab)\log_2 p(x|ab), \; p(x|ab) = \frac{c_{xab}}{c_{ab}} \quad [3]$$

In formula [3], "a" and "b," respectively, stand for single word segments of minimum granularity. "ab" stands for text data resulting from the combination of two segment words; p(x|ab) stands for the probability of the word segment "x" appearing on the left assuming that "ab" appears in the characteristic computation data. "Left" refers to the word segment set appearing on the left of "ab." $c_{xab}$ stands for the number of times the word segment "x" appears on the left of "ab." $c_{ab}$ stands for the number of times "ab" appears. In the computation of left entropy, p(x|ab) and $\log_2$ p(x|ab) are positively correlated.

In some embodiments, the formula to compute right entropy (RE) is:

$$RE(ab) = \sum_{y \in right} -p(y|ab)\log_2 p(y|ab), \; p(y|ab) = \frac{c_{aby}}{c_{ab}} \quad [4]$$

In formula [4], "a" and "b," respectively, stand for single word segments of minimum granularity. "ab" stands for text data resulting from the combination of two segment words. p(y|ab) stands for the probability of the word segment "y" appearing on the right assuming that "ab" appears in the characteristic computation data. "Right" refers to the word segment set appearing on the right of "ab." $c_{aby}$ stands for the number of times a word segment "y" appears on the right of "ab"; $c_{ab}$ stands for the number of times "ab" appears, and in the computation of right entropy, p(y|ab) and log 2 p(y|ab) are positively correlated.

For example, if the characteristic computation data is "round collar women's apparel, batwing sleeve T-shirt, batwing sleeve one-piece dress," after carrying out segmentation of the characteristic computation data using text data of minimum granularity, we obtain "round collar," "women's apparel," "batwing," "sleeve," "T-shirt," "batwing," "sleeve," "one-piece dress." When left entropy is computed for the two-segment combination "batwing sleeve," "a" is "batwing," "b" is "sleeve." The word segments that appear on the left of "batwing sleeve" in the characteristic computation data are "women's apparels" and "T-shirt"; hence the number of "x" is 2, "women's apparel" and "T-shirt," respectively; the number of times that "batwing sleeve" appears ($c_{ab}$) is 2. When right entropy is computed for "batwing sleeve," "a" is "batwing," "b" is "sleeve"; the word segments "y" appearing on the right of "batwing sleeve" are "T-shirt" and "one-piece dress."

In some embodiments, the formula to compute the position-based in-word probability of a character is:

$$IP(s) = IP(c,1) \times IP_{min}(c,2) \times IP(c,0) \quad [5]$$

In formula [5], "s" stands for the word segment to be computed; IP(c, 1) stands for the probability, statistically computed based on the word segment dictionary, of the initial character in "s" appearing at the beginning of a word segment in the word segment dictionary if the word segment dictionary is in a character-based language such as Chinese, or of the initial word in "s" appearing at the beginning of a word segment in the word segment dictionary if the word segment dictionary is based on a word-based language such as English. In the discussion below, word segment dictionary based on a character-based language such as Chinese is described. IP(c, 2) stands for the probability, statistically computed based on the word segment dictionary, of the character/word in the middle position of "s" appearing in the middle position of word segments in the word segment dictionary. In the event that there are several characters in the middle position of "s", the probability is computed of each of the characters appearing in the middle position of word segments in the word segment dictionary, and then the smallest of these is considered $IP_{min}(c, 2)$ to compute the position-based in-word probability of a character. IP(c, 0) stands for the probability, statistically computed based on the word segment dictionary, of the final character of "s", based statistically on the word segment dictionary, appearing at the end of word segments in the word segment dictionary. When computing the position-based in-word probability of a character, IP(c,1), $IP_{min}(c,2)$, and IP(c, 0) are positively correlated. In some embodiments, in the process of obtaining the screening criteria, the word segment to be computed refers to a sample word, and in the process of target word recognition, the word segment to be computed refers to a candidate word.

For example, assume the word segment to be computed is "阿里淘宝" ("a li tao bao"—a hypothetical brand name). IP(c, 1) stands for the probability of appearance of all the word segments whose initial character is "阿" ("a") based on the word segment dictionary statistics. IP(c,0) stands for the probability of appearance of all the word segments whose final character is "宝" ("bao") based on the word segment dictionary statistics. For IP(c,2) there are two values: one is the probability of appearance of all the word segments whose middle character is "里" ("li") based on the word segment dictionary statistics, and the other is the probability of appearance of all the word segments whose middle character is "淘" ("tao") based on the word segment dictionary statistics. When computing the position-based in-word probability of a character, the smaller of the two IP(c,2) values is selected as IP(c,2).

Figure 3:
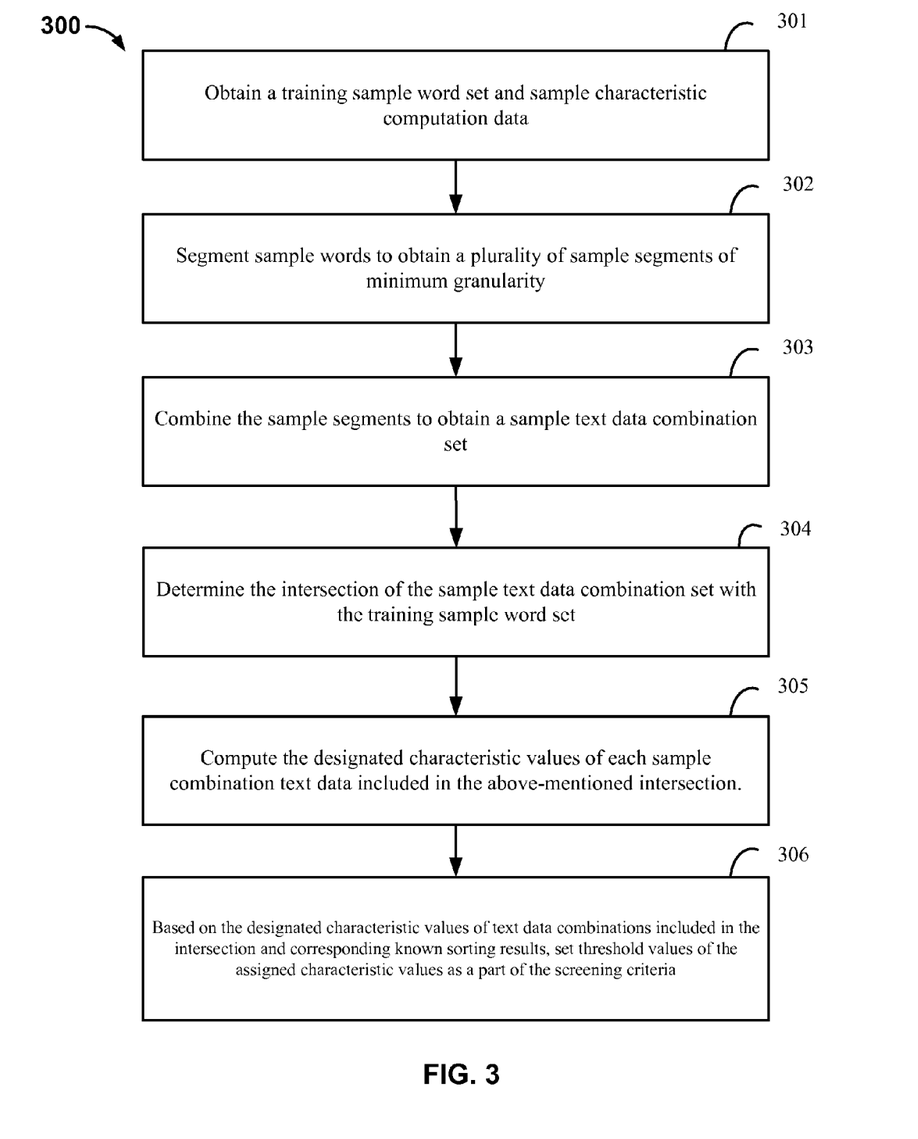
FIG. 3 is a flowchart illustrating an embodiment of a process of obtaining the screening criteria.

In some embodiments, screening criteria are obtained prior to performing target word recognition. In some implementations, the process of establishing screening criteria is a process of machine learning. FIG. 3 is a flowchart illustrating an embodiment of a process of obtaining the screening criteria. Process 300 may be performed on a system such as 200.

At 301: obtain a training sample word set and sample characteristic computation data. In this example, the training sample word set includes a set of known, sorted results. Within the training sample word set, it is already known whether or not any word is a target word in a dictionary. Words recognized as target words are sorted as one type, and works not recognized as target words are sorted as another type. Markers, flags, or other similar data structures may be included in the training sample word set to indicate whether the corresponding words are target words.

The training sample word set includes a positive example word set and a negative example word set. A positive example word means that the word is a target word, while a negative example word means that the word is not a target word (also referred to as a noise word.) In this case, a positive example word set can be retrieved directly from the word segment dictionary, while a negative example word set is based on noise words obtained by manual examination and verification during the process of building the word segment dictionary.

For example, if "batwing sleeve" is in the word segment dictionary, then it is a known positive example as well as a target word in the training sample word set. If "sleeve T-shirt" is not in the word segment dictionary, then it is a known negative example/noise word in the training sample word set.

Here, the sample characteristic computation data includes the training sample words in the training sample word set, and the designated characteristic values of words in the training sample word set.

At 302, the sample characteristic computation data is segmented to obtain a plurality of sample segments of minimum granularity.

In some embodiments, the text data of minimum granularity is a single character. Segmentation of the sample characteristic computation data is carried out using a character as a unit and the sample characteristic computation data is segmented into multiple characters. It is preferable, however, to take text data in which the most concise term that is capable of expressing linguistic meaning to serve as the minimum granularity for separating the sample characteristic computation data into multiple word segments. Using the text data in which the most concise term that is capable of expressing linguistic meaning serves as the minimum granularity can reduce the computation time and increase efficiency compared to the method in which a single character serves as the text data of minimum granularity.

For example, segmentation of sample characteristic data of "round collar women's apparel, batwing sleeve women's apparel" using the most concise term that is capable of expressing linguistic meaning as the text data of the minimum granularity results in the following five segments: "round collar," "women's apparel," "batwing," "sleeve," "women's apparel."

At 303, the sample segments are combined to obtain a sample text data combination set.

In some embodiments, a language model is used to combine the sample segments. In some embodiments, an n-gram language model (also referred to as "n-step Markov chain") is used to combine the sample segments and determine a sample text data combination set for further processing. Specifically, n-gram windows that are based on an n-gram model are used with the sample segments as the basic units, the n-gram windows are shifted according to an established sequence, and combining processing is carried out of word segments contained within the windows to obtain multiple sample text data combination.

In some embodiments, the value of n in the n-gram model is 2 or 3. n of 2 indicates that a two-gram window was used for two-element combination, that is, as the window shifts, the sample segments are respectively combined into doublets with the adjoining word components. n of 3 indicates that a three-gram window was used for three-element combination, that is, as the window shifts, the sample segments are respectively combined into triplets with the adjoining word components.

If an n-gram model is used to combine the sample segments from the above-mentioned example, when n is 2, the following text data combination set can be obtained: "round collar women's apparel," "women's apparel batwing," "batwing sleeve," "sleeve women's apparel"; when n is 3, the following text data combination set can be obtained: "round collar women's apparel batwing," "women's apparel batwing sleeve," "batwing sleeve women's apparel."

At 304, the intersection of the sample text data combination set and the training sample word set is determined.

At 305, the designated characteristic values of the sample text data combinations included in the intersection are computed.

Based on the word segment set obtained after the separation of sample characteristic computation data based on the above-mentioned text data of minimum granularity and the sample text data combination set that serves as the above-mentioned object of processing, multiple designated characteristic values are computed for the sample text data combinations included in the above-mentioned intersection, and these characteristic values can include mutual information value, logarithmic likelihood ratio value, context entropy (left entropy, right entropy) value, the value of the position-based in-word probability of a character as described above, as well as dice matrix value, Chi value, etc.

Here, when designated characteristic values are computed for the sample text data combinations included in the intersection, it is possible, through the computation of the designated characteristic values of each sample text data combination in a sample text data combination set, to further get the designated characteristic values of each sample text data combination in the above-mentioned intersection. It is also possible to directly compute the designated characteristic values of each sample text data combination included in the above-mentioned intersection.

At 306, based on the designated characteristic values of each sample text data combination in the intersection and the known sorted results in the sample word set, set threshold values of the designated characteristic values to obtain corresponding screening criteria based on the threshold values.

By determining the intersection of the sample text data combination set and the training sample word set, designated characteristic values are obtained that correspond to each word in the training sample word set. The words contained in the above-mentioned intersection are both the sample text data combinations and the training sample words. The sorting results for the training sample words are known; stated another way, it is known whether or not the training sample words are target words. When a sorting technique is used to carry out the sorting of the training sample words in the intersection, words that belong to the target words are sorted as one type, and words that do not belong to target words are sorted as another type.

When a sorting technique is used to sort the training sample words, the sorting technique carries out the sorting of the training sample words based on the training sample words and the corresponding characteristic values; the obtained sorting results are compared to the known sorted results of the training sample words, and the characteristic values are combinations of any two or more of the designated characteristic values. If the comparison reveals that the two results do not match, the sorting technique is adjusted with regard to the threshold values set for individual designated characteristic values, and the sorting of the training sample words is carried out once again; the above process is repeated until the sorting technique is able to accurately sort the training sample data. The process above is a machine learning process and a training process; upon using large amounts of training sample data and repeating the above-mentioned training process, the resulting threshold values established for individual characteristic values form corresponding screening criteria out of the threshold values that are set for individual characteristic values.

Here, the resulting screening criteria are expressions based on specific knowledge. In various embodiments, these expressions may be discrete structures such as trees, diagrams, networks, rules, mathematical formulas, or other appropriate data structures.

For example, when the gradient boosting and decision tree (GBDT) sorting technique is used, the training of the sorting technique is carried out using the training sample word set, and the resulting screening criteria are a sorting rule with a tree structure. The GBDT sorting technique employs a certain number of decision trees. A decision tree can be expressed as $$F(x) = \sum_{R_i} I(x \in R_i) f_i, R_i \cap R_j = \emptyset, \forall i \neq j,$$

where $R_i$ stands for one interval (such as, $R_i = \{x | x_1 < 0.2, 0.3 \leq x_2 < 0.7\}$).

Based on the decision tree, the GBDT sorting technique can be expressed as:

$$F(x) = F_0 + \sum_{m=1}^{M} F_m(x)$$

Where $F_m(x)$ is a function that can be estimated using the least squares method and maximum entropy.

The training of the GBDT sorting technique is carried out using a training sample word set; for example, the positive example words in the training sample word set include "soothing herbal tea," "tagging gun," and "apple cider vinegar," while the negative example words include "upright edition" and "class class train." Assume that the sample characteristic computation data and the characteristic value of each training sample word is computed separately. The computed mutual information of "soothing herbal tea" is 3.03, and its left entropy is 2.52; the mutual information of "tagging gun" is 3.93 and its left entropy is 0; the mutual information of "apple cider vinegar" is 1.39, its left entropy is 3.88. The mutual information of "upright edition" is 0.66, its left entropy is 1.88; the mutual information of "class class train" is 13.68, its left entropy is 2.88. Therefore, based on the training sample word set and the characteristic value of each sample, the resulting screening criterion is as follows:

Determine the interval to which the mutual information value from the designated characteristic values belongs: if the mutual information value is greater than 1.0 but smaller than 8.0, then return 1; otherwise, determine the interval to which the value of the left entropy from the designated characteristic values belongs. If the value of the left entropy is less than 0.9 or greater than 2.2 but less than 2.65 or greater than 3.3, then return 1; otherwise return 0.

Here, when 1 is returned, this means that the input is a positive example word/target word; when 0 is returned, this means that the return is a negative example word/non-target word.

In the example, the screening criteria are obtained based only on a small number of training sample words and a small quantity of characteristic values of each training sample word. In practice, large numbers of training sample words can be used to train the sorting technique and obtain screening criteria that accurately recognize target words.

Figure 4:
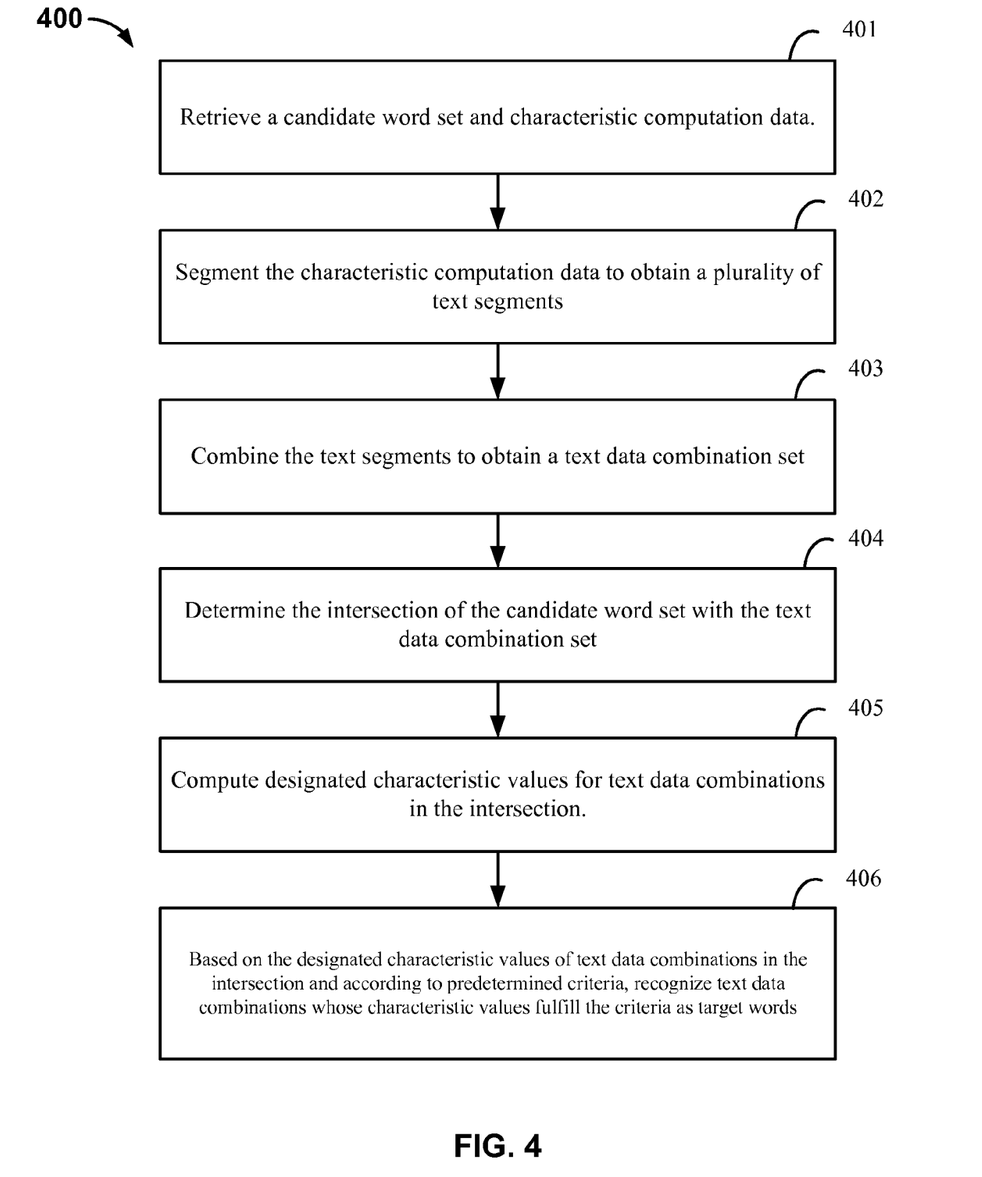
FIG. 4 is a flowchart illustrating another embodiment of a process of target word recognition.

FIG. 4 is a flowchart illustrating another embodiment of a process of target word recognition. Process 400 may be performed on a system such as 200.

At 401, a candidate word set and characteristic computation data are retrieved.

For example, the candidate word set can be retrieved from a C2C website query log that stores query keywords inputted by users. The queries may be filtered for noise and be deduplicated (or processed in other appropriate ways) to retrieve candidate data. Product headers most recently filled in by the C2C website vendors will serve as the characteristic computation data.

At 402, segmentation is performed on the characteristic computation data to obtain a plurality of text segments, where the segmentation is based on text data of minimum granularity.

In some embodiments, the text data of minimum granularity is a single character. Segmentation of the characteristic computation data is carried out using a character as a unit and the characteristic computation data is segmented into multiple characters. It is preferable, however, to take text data in which the most concise term that is capable of expressing linguistic meaning to serve as the minimum granularity for separating the sample characteristic computation data into multiple segments. Using the text data in which the most concise term that is capable of expressing linguistic meaning serves as the minimum granularity can reduce the computation time and increase efficiency compared to the method in which a single character serves as the text data of minimum granularity.

For example, by separating the sample characteristic computation data into word segments with regard to the characteristic computation data "round collar women's apparel, batwing sleeve women's apparel" using the most concise term that is capable of expressing linguistic meaning as the text data of the minimum granularity, five segments can be obtained: "round collar," "women's apparel," "batwing," "sleeve," "women's apparel."

At 403, combine the text segments to obtain a text data combination set.

A language model is used to carry out word segment combining processing of the text segments. In some embodiments, an n-gram model is used to carry out the combining and determine a text data combination set that serves as the object of processing; specifically, a n-gram model based on n-gram windows is used to separate the segments obtained into basic units, the n-gram windows are shifted according to an established sequence, and combining processing is carried out with respect to the word segments contained within the windows. In some embodiments, the value of n in the n-gram model is 2 or 3. When n is 2, this indicates that a two-gram window was used for two-element combination, that is, as the window shifts, the word segments resulting from separation are respectively combined into doublets with the adjoining word components. Likewise, when n is 3, this indicates that a three-gram window was used for three-element combination, that is, as the window shifts, the word segments resulting from separation are respectively combined into triplets with the adjoining word components.

For example, the characteristic computation data is "Adidas brand sneakers free shipping." Taking text data in which the most concise term that is capable of expressing linguistic meaning serves as the minimum granularity and carrying out segmentation of the characteristic computation data into multiple text segments, the following text segments can be obtained: "Adidas," "brand," "sneakers," "free shipping." Using the n-gram model and carrying out two-element combinations (that is, n=2), text data combinations of "Adidas brand," "brand sneakers," and "sneakers free shipping" are obtained. For the same text segments of "Adidas," "brand,"

"sneakers," and "free shipping," if an n-gram model is used and three-element combinations are carried out (that is, n=3), text data combinations of "Adidas brand sneakers" and "brand sneakers free shipping" are obtained.

At 404, determine the intersection of the candidate word set and the text data combination set.

At 405, compute the designated characteristic values for the text data combinations included in the above-mentioned intersection.

The designated characteristic values can include combinations of any two or more kinds of the following values: mutual information value, logarithmic likelihood ratio value, context entropy (left entropy, right entropy) value, the value of the position-based in-word probability of a character, as well as dice matrix value, Chi value, etc.

In some embodiments, when computing designated characteristic values, the "a" word and "b" word in the formula can be considered text data resulting from the combining of multiple text segments. Individual characteristic values are computed in accordance with the formulas described above.

For example, when computing mutual information for the text data "abc," the text data can be split into "ab" and "c," or "a" and "bc." Mutual information is computed separately with regard to the above-mentioned resulting two groups of text data and the greater of the two computation results is considered to be the mutual information of the text data "abc." Likewise, when computing the logarithmic likelihood ratio, "abc" can also be split into either "ab" and "c," or "a" and "bc." The logarithmic likelihood ratio is computed separately with regard to the above-mentioned resulting two groups of text data, and the greater of the two computation results is considered to be the logarithmic likelihood ratio of the text data "abc."

At 406, based on the designated characteristic values of text data combinations included in the above-mentioned intersection, the screening of the text data combinations is carried out according to predetermined screening criteria. The candidate words corresponding to the text data combination whose characteristic values fulfill the screening criteria to be the target words are recognized. The screening criteria are predetermined based on multiple designated characteristic values.

Here, the text data combination in the intersection also serves as the candidate words, and when designated characteristic values of the text data combination in the intersection are computed, it is possible, through the computation of designated characteristic values of text data combinations in a text data combination set, to further obtain designated characteristic values of text data combinations in the above-mentioned intersection. It is also possible to directly compute multiple designated characteristic values of each text data combination contained in the above-mentioned intersection. The individual characteristic values of the text data combination contained in the above-mentioned interaction obtained through computations serve simultaneously as the individual characteristic values corresponding to the candidate words.

The screening criteria based on multiple designated characteristic values are obtained via the process of establishing screening criteria (that is, the training process). Depending on different sorting techniques used, the forms of expression of these predetermined screening criteria also vary: they can be such discrete structures as trees, diagrams, networks, or rules; they can also be mathematical formulas. For example, the predetermined screening criteria can be expressed using a mathematical formula as:

$$f(p_1, p_2) = \begin{cases} 1, \text{ if } p_1 > p_2 \\ 0, \text{ otherwise,} \end{cases} \text{ where}$$

$$p_i = \exp(L_i - c),$$

$$L_1 = -0.0728575 \times MI + 0.17012 \times LE,$$

$$L_2 = 0.0728575 \times MI - 0.17012 \times LE,$$

$$c = \operatorname*{Max}_{i \in \{1,2\}}(L_i)$$

In the formula above, when $p_1$, obtained based on the computation of designated characteristic values is greater than $p_2$, the candidate words are determined to be target words; otherwise, the candidate words can be determined not to be target words.

When candidate words are screened according to predetermined screening criteria, the designated characteristic values of the text data combination contained in the above-mentioned intersection are compared against threshold values that are determined based on the predetermined screening criteria and correspond to the above-mentioned designated characteristic values, and the candidate words corresponding to the text data combination whose characteristic values fulfill the screening criteria are determined to be the target words. Here, when comparing the designated characteristic values of the text data combination contained in the above-mentioned intersection against threshold values that are determined based on predetermined screening criteria and correspond to the above-mentioned designated characteristic values, it is possible to compare the designated characteristic values of the text data combination contained in the above-mentioned intersection against threshold values that are determined based on predetermined screening criteria and correspond to the above-mentioned designated characteristic values or to enter the designated characteristic values of the text data combination contained in the above-mentioned intersection into the formula that determines the screening criteria, and subsequently compare the computed values against threshold values determined by the screening criteria.

In some embodiments, once recognition with regard to candidate words has been carried out, we learn that when the candidate words are target words, the target words are looked up in the dictionary of known word segments; when the target words are not contained in the dictionary of known word segments, the target words are determined to be previously unlisted words, and the target words are added into the word segment dictionary.

Preferably, it is possible, prior to carrying out recognition with regard to candidate words, to compare candidate words against the dictionary of known word segments; when the word segments are not contained in the dictionary of known word segments, then recognition is carried out with regard to candidate words; once the candidate words are determined to be target words, they are added into the known word segment dictionary. Upon comparison of the candidate words to the known word segment dictionary, if the candidate words are found to already exist in the word segment dictionary, this means that the candidate words are listed words, that is, the candidate words are target words, and, moreover, they are listed in the word segment dictionary, and there is no need to carry out the recognition process.

Based on the above-mentioned embodiment, through segmentation of the characteristic computation data, the characteristic computation data is separated into segments of minimum granularity; then, a language model is used to carry out segment combining; based on combined text data, designated characteristic values of candidate words are computed; recognition of the candidate words is carried out according to predetermined screening criteria, thus utilizing the multiple designated characteristic values to perform recognition of the candidate words. Moreover, instead of manually set threshold values, the screening criteria are obtained through the carrying out of sorting technique training using training data, thus avoiding errors resulting from manual setting and increasing accuracy and stability. Furthermore, when sorting technique training is used to establish screening criteria to carry out recognition of candidate words, the individual designated characteristic values of candidate words are not required to display linear distribution, and when individual designated characteristic values display non-linear distribution, it is still possible to accurately recognize candidate words, and increase recognition accuracy and recall rate.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of target word recognition, comprising:
   obtaining a candidate word set and corresponding characteristic computation data, the candidate word set comprising text data, and characteristic computation data being associated with the candidate word set;
   performing segmentation of the characteristic computation data to generate a plurality of text segments;
   combining the plurality of text segments to form a text data combination set;
   determining an intersection of the candidate word set and the text data combination set, the intersection comprising a plurality of text data combinations;
   determining a plurality of designated characteristic values for the plurality of text data combinations;
   determining, using a processor, a criterion, including:
      obtaining a training sample word set and sample characteristic computation data, the sample characteristic computation data comprising a plurality of sample words and designated characteristic values of the plurality of sample words;
      obtaining a sample text data combination set based on the plurality of sample words;
      determining a plurality of designated characteristic values of sample text data combinations in an intersection of the sample text data combination set and the training sample word set; and
      setting a threshold value of a designated characteristic value of a sample text data combination in the intersection as a part of the criterion; and
         based at least in part on the plurality of designated characteristic values for the plurality of text data combinations and according to at least the criterion, recognizing among the plurality of text data combinations, target words whose characteristic values fulfill the criterion.

2. The method of claim 1, wherein the candidate word set is based on user-inputted query keywords to a website.

3. The method of claim 1, wherein the characteristic computation data is obtained from descriptions of search results in response to user-inputted query keywords to a website.

4. The method of claim 1, wherein at least some of the target words are unlisted words in a dictionary, and the method further comprises adding the unlisted words to the dictionary.

5. The method of claim 1, wherein the designated characteristic values include mutual information.

6. The method of claim 1, wherein the designated characteristic values include logarithmic likelihood.

7. The method of claim 1, wherein the designated characteristic values include context entropy.

8. The method of claim 1, wherein the designated characteristic values include position-based in-word probability.

9. The method of claim 1, wherein combining the plurality of sample segments includes applying an n-gram language model to the plurality of sample segments.

10. The method of claim 1, wherein setting the threshold value includes:
    sorting a training sample word in the intersection using the threshold value to reach a determination of whether the training sample word in the intersection is a target word;
    comparing the determination with a known result; and
    adjusting the threshold value if the determination does not match the known result.

11. The method of claim 1, wherein combining the plurality of text segments to form a text data combination set includes:
    adoption of an n-gram model based on n-gram windows, shifting of the n-gram windows according to a predetermined sequence, and performance of word segment combination of the word segments contained within the windows to obtain a post-combining text data combination.

12. A target word recognition system, comprising:
    one or more processors configured to:
       obtain a candidate word set and corresponding characteristic computation data, the candidate word set comprising text data, and characteristic computation data being associated with the candidate word set;
       perform segmentation of the characteristic computation data to generate a plurality of text segments;
       combine the plurality of text segments to form a text data combination set;
       determine an intersection of the candidate word set and the text data combination set, the intersection comprising a plurality of text data combinations;
       determine a plurality of designated characteristic values for the plurality of text data combinations;
       determine a criterion, including:
          obtain a training sample word set and sample characteristic computation data, the sample characteristic computation data comprising a plurality of sample words and designated characteristic values of the plurality of sample words;
          obtain a sample text data combination set based on the plurality of sample words;
          determine a plurality of designated characteristic values of sample text data combinations in an intersection of the sample text data combination set and the training sample word set; and
          set a threshold value of a designated characteristic value of a sample text data combination in the intersection as a part of the criterion; and
       based at least in part on the plurality of designated characteristic values for the plurality of text data combinations and according to at least the criterion, recognize among the plurality of text data combinations, target words whose characteristic values fulfill the criterion; and one or more memories coupled to the one or more processors, configured to provide the one or more processors with instructions.

13. The system of claim 12, wherein the candidate word set is based on user-inputted query keywords to a website.

14. The system of claim 12, wherein the characteristic computation data is obtained from descriptions of search results in response to user-inputted query keywords to a website.

15. The system of claim 12, wherein combining the plurality of sample segments includes applying an n-gram language model to the plurality of sample segments.

16. The system of claim 12, wherein setting the threshold value includes:
   sorting a training sample word in the intersection using the threshold value to reach a determination of whether the training sample word in the intersection is a target word;
   comparing the determination with a known result; and
   adjusting the threshold value if the determination does not match the known result.

17. The system of claim 12, wherein combining the plurality of text segments to form a text data combination set includes:
   adoption of an n-gram model based on n-gram windows, shifting of the n-gram windows according to a predetermined sequence, and performance of word segment combination of the word segments contained within the windows to obtain a post-combining text data combination.

18. A non-transitory computer program product for target word recognition, the computer program product being embodied in a tangible non-transitory computer readable storage medium and comprising computer instructions for:
   obtaining a candidate word set and corresponding characteristic computation data, the candidate word set comprising text data, and characteristic computation data being associated with the candidate word set;
   performing segmentation of the characteristic computation data to generate a plurality of text segments;
   combining the plurality of text segments to form a text data combination set;
   determining an intersection of the candidate word set and the text data combination set, the intersection comprising a plurality of text data combinations;
   determining a plurality of designated characteristic values for the plurality of text data combinations;
   determining a criterion, including:
      obtaining a training sample word set and sample characteristic computation data, the sample characteristic computation data comprising a plurality of sample words and designated characteristic values of the plurality of sample words;
      obtaining a sample text data combination set based on the plurality of sample words;
      determining a plurality of designated characteristic values of sample text data combinations in an intersection of the sample text data combination set and the training sample word set; and
      setting a threshold value of a designated characteristic value of a sample text data combination in the intersection as a part of the criterion; and
   based at least in part on the plurality of designated characteristic values for the plurality of text data combinations and according to at least the criterion, recognizing among the plurality of text data combinations, target words whose characteristic values fulfill the criterion.

19. A method of target word recognition, comprising:
   obtaining a candidate word set and corresponding characteristic computation data, the candidate word set comprising text data, and characteristic computation data being associated with the candidate word set;
   performing segmentation of the characteristic computation data to generate a plurality of text segments;
   combining the plurality of text segments to form a text data combination set;
   determining an intersection of the candidate word set and the text data combination set, the intersection comprising a plurality of text data combinations;
   determining a plurality of designated characteristic values for the plurality of text data combinations;
   determining, using a processor, a criterion, including:
      obtaining a training sample word set and sample characteristic computation data, the training sample word set comprising a plurality of sample words and sorting results indicating whether each of the plurality of sample words is a target word, and the sample characteristic computation data comprising the plurality of sample words and designated characteristic values of the plurality of sample words;
      segmenting the plurality of sample words to obtain a plurality of sample segments of minimum granularity;
      combining the plurality of sample segments to obtain a sample text data combination set;
      determining an intersection of the sample text data combination set and the training sample word set;
      determining a plurality of designated characteristic values of sample text data combinations in the intersection; and
      setting a threshold value of a designated characteristic value of a sample text data combination in the intersection as a part of the criterion; and
   based at least in part on the plurality of designated characteristic values for the plurality of text data combinations and according to at least the criterion, recognizing among the plurality of text data combinations, target words whose characteristic values fulfill the criterion.

20. A target word recognition system, comprising:
   one or more processors configured to:
      obtain a candidate word set and corresponding characteristic computation data, the candidate word set comprising text data, and characteristic computation data being associated with the candidate word set;
      perform segmentation of the characteristic computation data to generate a plurality of text segments;
      combine the plurality of text segments to form a text data combination set;
      determine an intersection of the candidate word set and the text data combination set, the intersection comprising a plurality of text data combinations;
      determine a plurality of designated characteristic values for the plurality of text data combinations;
      determine a criterion, including:
         obtaining a training sample word set and sample characteristic computation data, the training sample word set comprising a plurality of sample words and sorting results indicating whether each of the plurality of sample words is a target word, and the sample characteristic computation data comprising the plurality of sample words and designated characteristic values of the plurality of sample words;

segmenting the plurality of sample words to obtain a plurality of sample segments of minimum granularity;

combining the plurality of sample segments to obtain a sample text data combination set;

determining an intersection of the sample text data combination set and the training sample word set;

determining a plurality of designated characteristic values of sample text data combinations in the intersection; and setting a threshold value of a designated characteristic value of a sample text data combination in the intersection as a part of the criterion; and based at least in part on the plurality of designated characteristic values for the plurality of text data combinations and according to at least the criterion, recognize among the plurality of text data combinations, target words whose characteristic values fulfill the criterion; and one or more memories coupled to the one or more processors, configured to provide the one or more processors with instructions.

21. A non-transitory computer program product for target word recognition, the computer program product being embodied in a tangible non-transitory computer readable storage medium and comprising computer instructions for:

obtaining a candidate word set and corresponding characteristic computation data, the candidate word set comprising text data, and characteristic computation data being associated with the candidate word set;

performing segmentation of the characteristic computation data to generate a plurality of text segments;

combining the plurality of text segments to form a text data combination set;

determining an intersection of the candidate word set and the text data combination set, the intersection comprising a plurality of text data combinations;

determining a plurality of designated characteristic values for the plurality of text data combinations;

determining a criterion, including:

obtaining a training sample word set and sample characteristic computation data, the training sample word set comprising a plurality of sample words and sorting results indicating whether each of the plurality of sample words is a target word, and the sample characteristic computation data comprising the plurality of sample words and designated characteristic values of the plurality of sample words;

segmenting the plurality of sample words to obtain a plurality of sample segments of minimum granularity;

combining the plurality of sample segments to obtain a sample text data combination set;

determining an intersection of the sample text data combination set and the training sample word set;

determining a plurality of designated characteristic values of sample text data combinations in the intersection; and setting a threshold value of a designated characteristic value of a sample text data combinations, in the intersection as a part of the criterion; and based at least in part on the plurality of designated characteristic values for the plurality of text data combinations and according to at least the criterion, recognizing among the plurality of text data combinations target words whose characteristic values fulfill the criterion.

* * * * *